(12) United States Patent
Krause et al.

(10) Patent No.: US 9,604,753 B2
(45) Date of Patent: Mar. 28, 2017

(54) ADHESIVE-TAPE SYSTEM FOR FORMING A TEAR-OPEN STRIP

(75) Inventors: Christian Krause, Rosengarten (DE); Ulrich Otten, Hamburg (DE); Tanja Urban, Hamburg (DE); Patrick Kerep, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 14/114,378

(22) PCT Filed: Apr. 2, 2012

(86) PCT No.: PCT/EP2012/055978
§ 371 (c)(1),
(2), (4) Date: Dec. 10, 2013

(87) PCT Pub. No.: WO2012/150099
PCT Pub. Date: Nov. 8, 2012

(65) Prior Publication Data
US 2014/0110465 A1    Apr. 24, 2014

(30) Foreign Application Priority Data

May 5, 2011    (DE) .................. 10 2011 075 313

(51) Int. Cl.
*B32B 7/12*    (2006.01)
*B65D 5/70*    (2006.01)
(Continued)

(52) U.S. Cl.
CPC ............... *B65D 5/708* (2013.01); *B65D 5/56* (2013.01); *C09J 7/0296* (2013.01);
(Continued)

(58) Field of Classification Search
CPC ... C09J 7/0296; C09J 2423/006; B65D 5/708; B65D 5/56; Y10T 428/2848; Y10T 428/266
(Continued)

(56) References Cited

U.S. PATENT DOCUMENTS 2,956,904 A    10/1960    Hendricks
3,088,848 A    5/1963    Tritsch
(Continued)

FOREIGN PATENT DOCUMENTS

CA    749198 A    12/1966
CN    86108155 A    6/1988
(Continued)

OTHER PUBLICATIONS

Abstract of JP 2004-250026A. See above for date and inventor.*
(Continued)

*Primary Examiner* — Victor Chang
(74) *Attorney, Agent, or Firm* — Norris McLaughlin & Marcus, P.A.

(57) ABSTRACT

An adhesive tape system, for opening cardboard packaging, having an adhesive tape A furnished on at least one side with an adhesive coating and having a film carrier, the film being a polyolefin film oriented monoaxially in the longitudinal direction of the strip, and the film comprising a mixture of an olefinic polymer and a polar nonolefinic polymer. The adhesive tape system also has an adhesive tape B furnished on at least one side with an adhesive coating and having a film carrier, wherein the adhesive tapes A and B are disposed one above the other.

14 Claims, 8 Drawing Sheets

Figure 1:
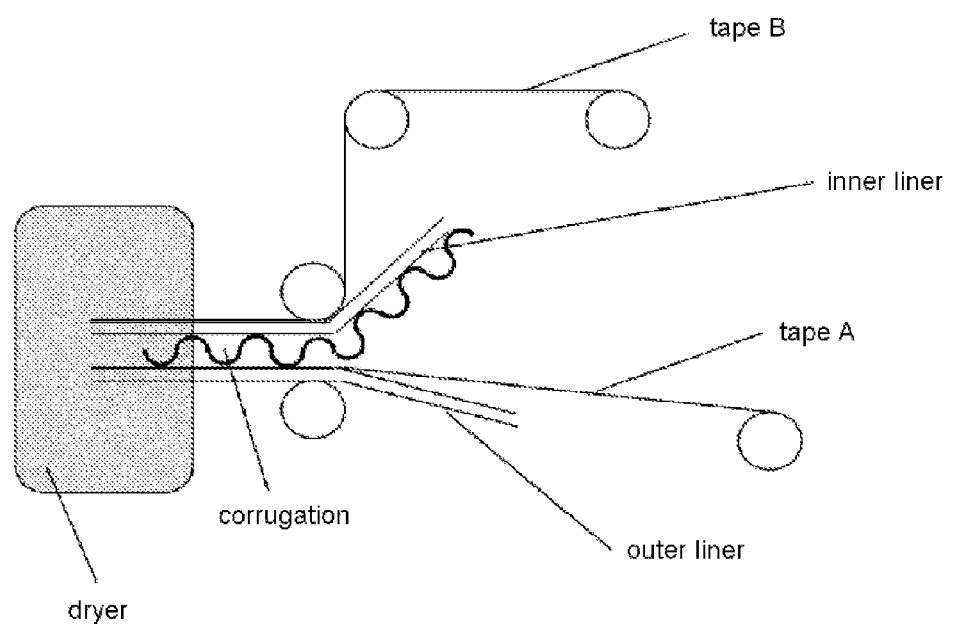

(51) Int. Cl.
*C09J 7/02* (2006.01)
*B65D 5/56* (2006.01)

(52) U.S. Cl.
CPC ...... *C09J 2423/006* (2013.01); *Y10T 428/266* (2015.01); *Y10T 428/2848* (2015.01)

(58) Field of Classification Search
USPC ..................................... 428/343, 354, 355 R
See application file for complete search history.

(56) References Cited

U.S. PATENT DOCUMENTS

| | | | |
|---|---|---|---|
| 3,187,982 A | 6/1965 | Underwood et al. | |
| 3,311,032 A | 3/1967 | Lucas | |
| 3,482,683 A | 12/1969 | Desnoyers | |
| 3,732,122 A | 5/1973 | Fehrn-Christensen | |
| 4,331,718 A | 5/1982 | Gleichechagen et al. | |
| 5,093,187 A | 3/1992 | Engelmann et al. | |
| 6,074,745 A | 6/2000 | Speeney | |
| 2001/0000480 A1* | 4/2001 | Stagg | B65D 33/16 428/43 |
| 2003/0176613 A1 | 9/2003 | Hohberg et al. | |
| 2010/0127062 A1 | 5/2010 | Rodewald | |
| 2011/0014450 A1* | 1/2011 | Michel et al. ................ | 428/220 |
| 2012/0298734 A1* | 11/2012 | Bradshaw et al. ............ | 229/212 |

FOREIGN PATENT DOCUMENTS

| | | |
|---|---|---|
| CN | 101978009 A | 2/2011 |
| DE | 2104817 A1 | 8/1971 |
| DE | 2845541 A1 | 6/1980 |
| DE | 8023682 U1 | 12/1981 |
| DE | 3640861 A1 | 6/1988 |
| DE | 4338524 A1 | 5/1995 |
| DE | 4402444 A1 | 8/1995 |
| DE | 102008005561 A1 | 7/2009 |
| DE | 102008058537 A1 | 5/2010 |
| EP | 0269967 A2 | 6/1988 |
| EP | 0960727 A2 | 12/1999 |
| EP | 1336683 A1 | 8/2003 |
| EP | 2189506 A2 | 5/2010 |
| JP | H11349907 A | 12/1999 |
| JP | 2004250026 A * | 9/2004 |
| WO | 95/20633 A1 | 8/1995 |
| WO | 2004054794 A1 | 7/2004 |
| WO | 2009092641 A1 | 7/2009 |

OTHER PUBLICATIONS

International Search Report for International Application No. PCT/EP2012/055978 dated Jul. 9, 2012.
German Office Action for corresponding German Application No. 10 2011 075 313.3 dated Apr. 30, 2012.
China Office Action for corresponding Chinese Application No. 201280033452.9 dated Jan. 29, 2015.
China Office Action for corresponding Chinese Application No. 201280033452.9 dated Apr. 15, 2016.
"RAL-GZ 492 Guetesicherung Wellpappe"; RAL Deutsches Institut fuer Guetesicherung and Kennzeichnung e.V.; 2005; pp. 1-7; Sankt Augustin, Germany.
"Easy-open Devices for Transit Cases"; Packaging Review; Feb. 1973; pp. 56-57; Germany.

* cited by examiner

ADHESIVE-TAPE SYSTEM FOR FORMING A TEAR-OPEN STRIP

The invention relates to an adhesive tape system for forming a tear strip.

Tear strips are known and serve in various forms as an opening aid firstly for cigarette packs, confectionary packs, and similar packs that are wrapped in a film, and secondly for cardboard packaging such as packs of laundry detergent, for instance. In these applications the tear strip is affixed to the pack in such a way that, for opening, the tear strip is pulled and thereby the wrapping film and/or the carton is parted open at the desired point.

Traditionally in use are tear strips furnished on one side with a hotmelt-based adhesive. They are described for example in U.S. Pat. No. 3,187,982 A, in U.S. Pat. No. 3,311,032 A, or CA 749 198 A.

Also in use is a tear strip furnished self-adhesively. For this, a monoaxially oriented carrier film is used which is equipped with a self-adhesive layer on one side and with a silicone release layer on the other side. Optionally there is printing below one of the two layers. Constructions of this or similar kind are known for the production of pressure-sensitive tapes, from DE 21 04 817 A, from U.S. Pat. No. 3,088,848 A, from U.S. Pat. No. 3,482,683 A, or from U.S. Pat. No. 2,956,904 A, for example. Not disclosed in those specifications is the use of such film constructions for self-adhesive tear strips. The use of self-adhesive tapes of this kind as tear strips is mentioned, however, in the journal "Packaging Review" from February 1973, page 57.

One specific embodiment of these self-adhesively furnished tear strips is described by DE 43 38 524 A1. A self-adhesive tear strip is disclosed therein that consists of a carrier film, a release layer, a layer of adhesive remote from the release layer, and optionally printing below the adhesive layer or release layer. The strip is characterized in that the carrier film consists of an oriented film, in that the release layer and adhesive layer are applied from aqueous solution, emulsion, or dispersion, and in that release layer, printing ink, and adhesive layer are applied on a machine in one operation to a film which is many times wider than the tear strip.

Customary for use as an opening aid for film packs are at least single-layer carrier films with a thickness of 15 to 60 μm that have been at least monoaxially and preferably biaxially oriented.

Self-adhesive or heat-activatable tear strips composed of polypropylene film oriented in machine direction have long been used for the tear-opening of cardboard packaging. They are offered in film thicknesses from 50 to 140 μm. Film thicknesses greater than 85 μm find use in the opening of particularly heavy cardboard packaging. More usual are tear strips in thicknesses between 60 and 90 μm.

Tear strips on a monoaxially oriented polypropylene carrier often use, for the carrier, a specific polymer blend which is optimized in its tear-open performance, resulting in machine-direction tensile strengths of 230 to 330 N/mm$^2$.

These polypropylene tear strips of preferably 60 to 65 μm display flawless tear-open behavior across all corrugated cardboard packaging, including card with microcorrugation. This applies irrespective of whether tearing is performed exactly in the direction of the adhered strip.

"Exactly in the direction of the adhered strip" means that in the tear-opening process, the tear strip is guided in such a way that the pulling direction never deviates from the direction mandated by the tear strip bonded on the carton reverse and which during the tear-open process is visible as a torn join even from the front of the carton. Only then is there a symmetrical distribution of forces in the tear strip during the tear-open process, and a uniform load on both cut edges. In practice, this ideal tearing direction is usually not observed. Deviations from this direction by up to about 30° can be expected.

A trend within the tear strip market is the deviation from a film formula optimized for tear-open performance. Reduced tear-open performance in this case is accepted willingly in order to obtain, in return, improved machine processability of the tear strip during its application.

For example, it is possible to reduce the impact modifiers to below the amount that is advisable for optimum tear-open performance, up to the point of their complete omission.

Heavy-duty solid card grades of around 1000 g/m$^2$ can be torn open faultlessly only in the optimum tear-open direction. In the event of deviation from this direction, the unsymmetrical load on the strip may result in tears during the tear-open operation that start from the more heavily loaded edge of the strip. The frequency of the tears is influenced, for example, by inhomogeneities in the film, by microindentations in the cut edges of the film strips, by wood particles or particularly solidified particles in the card, and similar phenomena. Also possessing an influence is the speed of tearing.

For the packaging of laundry detergents, solid cards, with a basis weight of between 450 and 600 g/m$^2$, are used to a relatively great extent, and in some cases have a wax-impregnated interlayer, but in any case are provided with a laminated-on outer layer of high-gloss cast-coated Chromolux papers. Tearing open these cards using the polypropylene tear strips can be accomplished only with a similarly poor result as for the abovementioned 1000 g/m$^2$ solid cards.

Known from EP 0 269 967 A1 is a tear strip which has a carrier oriented in predominantly one direction and which is provided with an adhesive layer, the carrier consisting of at least one base layer which is provided with at least one tough layer that is tougher than the base layer.

Particularly preferred is a tear strip having a carrier which is oriented in predominantly one direction and which is provided with an adhesive layer, the carrier consisting of at least one base layer comprising a polypropylene-olefin copolymer and/or a polypropylene/impact modifier mixture, this base layer being provided with at least one tough, polypropylene-containing layer that comprises an impact modifier and is tougher than the base layer.

In the case of polypropylene-based tear strips it is preferred to use TPP (corresponding to monoaxially oriented polypropylene (MOPP)), since the strain must be low even under high tensile load.

High tensile loads come about firstly, in the end application, when the tear strip is pulled when the pack is being opened, through the card or through the carton and/or the film, and is intended to part these components reliably. Such loads, secondly, also come about when the tear strip is being applied to the packaging, since it is frequently applied at speeds of more than 150 m/min. Particularly at the start, in other words when the tear strip is placed onto—for example—the card, the roll, up to about 15 kg in weight, to which the tear strip has customarily been converted in the trade, is accelerated suddenly and violently. Even in ongoing operation, tensile stresses of more than 8 N are often acting on the tear strips. This rules out the use of unoriented or else biaxially oriented polypropylene.

If TPP without release is used, then unwinding, i.e., the separation of the composition from the carrier, is accompanied by splitting of the carrier, meaning that some of the fibers stretched and oriented in the machine direction are extracted from the surface of the carrier. This may adversely affect the converting operation if the coated film web, which is very much wider than the tear strip, is slit into individual tear strips and for that purpose is unwound from the stock roll. The fibers projecting from the surface of the carrier themselves hinder the operation, or else there may be tearing of the carrier web as a whole. Moreover, similar problems may occur in the course of application to the packaging, when the tear strip is being unwound.

Sales trays which serve to accommodate products packed in individual cartons currently fulfill two functions. On the one hand, the cartons are arranged in a tray which is open at the top. In the shop, this tray is offered in a visually appealing fashion to a customer, who is able to take individual cartons from the tray. The effect of the tray is that the cartons remain grouped and always in an ordered upright position.

On the other hand, the trays are intended to protect the cartons in the tray on the journey from the producer or filler to the shop. For this purpose, the product is surrounded fully by a packaging of card, which is torn open to present the contents, using a tear strip. The upper part of the carton is removed, with the lower part serving as the sales tray.

In order to evoke a visually appealing impression, the tear line must have a clean and smooth edge finish. The card of which the carton is made should not fray, and the tear must also run straight with maximum precision. The skilled person in this context refers to a "clean cut".

For the opening of cardboard packaging in such a way that a clean cut is produced, there are primarily two solutions in existence.

The so-called Adalis system (developed by the company Adalis) consists of two adhesive tapes (guide adhesive tape=tape A and tear strip=tape B) which are installed in the carton as shown in FIG. 1. The carton is composed of an inner liner and an outer liner, with a corrugation of card being disposed in customary fashion between the liners.

The adhesive tapes consist of a carrier material composed of numerous polyester filaments held together with an adhesive. The carrier material is coated with a hotmelt adhesive. The two liners and also the corrugation and the two adhesive tapes here pass through a heating tunnel, producing a laminate in accordance with FIG. 1.

A disadvantage of this system is that the adhesive tapes used are very thick (2×170 μm) and consequently the printed image on the external, visible liner is impaired through wear at the raised points during transport and storage. Furthermore, as part of a manufacturing operation, a large number of these unmade cartons (carton blanks) and folded boxes are stacked. Since the adhesive tapes are always applied at the same point on the carton blank, this leads to an increase in thickness at this location within the stack. As a result, the stack becomes skewed, and, on exceeding a particular degree of inclination, the sheets begin to slip; the resulting stacks are unstable. Moreover, owing to the high thickness, the number of linear meters of adhesive tape, for a given width and given roll dimensions on a roll of adhesive tape, is much lower than for thinner tapes. For the corrugated packaging industry, however, a frequent necessity is to run relatively long production campaigns, meaning either that the line must be halted for changing of the rolls or that a splice must be made on the running line, an operation always associated with a high risk of tearing.

Furthermore, problems may arise during the printing of such cartons, since the different thicknesses of the print substrate produce different printing conditions in the printing operation, and this may result in an uneven printed image.

For the processor of corrugated packaging sheets with tear strips, therefore, there is an interest in using, above all, thin adhesive tapes, in order that such problems do not arise.

Figure 2:
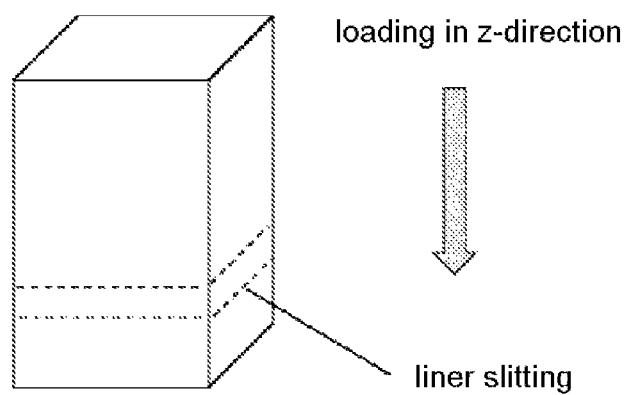

One variant involves slitting, and hence weakening, the carton, provided with the tear strip, in the region above the outer edges of the tear strip (known as "liner slitting"). This is shown by FIG. 2. For this case it is possible to employ a tear strip with a thickness, for example, of only 90 μm, which largely avoids the problems outlined above.

The outer liner is scored superficially beforehand along the desired tear edge, so that on opening it leaves behind a clean tear edge and produces, after opening, a visually appealing display. A disadvantage of this solution is that the detriment to the outer liner causes losses of stability in the z-direction of the carton. The carton gives way preferentially at the detriment location. This phenomenon is measured using the test known as the box compression test.

A consequence of this solution, then, is to reduce the stackability of the made-up cartons.

It is an object of the invention to obtain a marked improvement over the prior art and to provide a solution with which a carton can be torn open, with clean cut edges being produced in the carton, and with the solution causing as little thickening of the carton as possible.

This object is achieved by means of an adhesive tape system as characterized more closely in the main claim. The dependent claims describe advantageous embodiments of the invention. Further encompassed by the concept of the invention are uses of the adhesive tape system of the invention, and a carton furnished with the adhesive tape system.

The invention accordingly provides an adhesive tape system particularly for opening cardboard packaging, consisting of an adhesive tape A furnished on at least one side with an adhesive coating and having a film carrier, the film being a polyolefin film oriented monoaxially in the longitudinal direction of the strip, and the film comprising a mixture of an olefinic polymer and a polar nonolefinic polymer, and consisting of an adhesive tape B furnished on at least one side with an adhesive coating and having a film carrier, the adhesive tapes A and B being disposed one above the other.

It is within the concept of the invention for the film carriers of the adhesive tapes A and B to be identical or at least for both to comprise the described mixture of an olefinic polymer and a polar nonolefinic polymer. Preferred, therefore, is an embodiment in which the film carrier of the adhesive tape A and the film carrier of the adhesive tape B is a polyolefin film oriented monoaxially in the longitudinal direction of the strip, and the film comprises a mixture of an olefinic polymer and a polar nonolefinic polymer, with the two film carriers being able, with further preference, to be identical. In the case of this embodiment it is additionally preferred for the two adhesive tapes to have the identical width.

Described in more detail hereinafter first of all is the film carrier of the adhesive tape A. In the film of the adhesive tape A, the fraction of polar nonolefinic polymer in the mixture is preferably in the range from 5 to 50 wt %, preferably 20 to 30 wt %.

To achieve high tensile strengths, high stresses at 10% strain, and high tear propagation resistance, the conditions in the drawing operation ought to be selected such that the draw ratio is the maximum technically feasible ratio for each film. In accordance with the invention the machine-direction draw ratio is preferably at least 1:4.5, more preferably at least 1:6.

A draw ratio of, for example 1:6 indicates that a primary film segment 1 m long becomes a drawn film segment 6 m long. The draw ratio is oftentimes also termed the ratio of the linear speed prior to orientation to the linear speed after orientation. Here, it is the first definition that is used.

In one preferred version of the invention, the film has the following properties:
- a machine-direction tensile strength of 200 N/mm$^2$ to 300 N/mm$^2$, preferably 220 N/mm$^2$ to 260 N/mm$^2$, more preferably 240 N/mm$^2$, and/or
- a machine-direction stress at 10% strain of at least 80 N/mm$^2$, preferably at least 130 N/mm$^2$, more preferably at least 150 N/mm$^2$.

Strength values are calculated by dividing the width-based force values by the thickness. Where the strength values are determined on the adhesive tape, the thickness taken as a basis is not the total thickness of the adhesive tape A, but only that of the carrier film.

As shown by experiments with experimental constructions from Zwick, these constructions being known to the skilled person, it is practically impossible to sever the film in the cross direction. In the sample for investigation, the film edge is impaired by an incision in cross direction. When tension is then exerted, the tear does not propagate in the cross direction but is instead diverted into the machine or longitudinal direction.

The thickness of the carrier film is preferably between 15 and 200 µm, more preferably between 30 and 140 µm, very preferably between 50 and 100 µm.

A thickness of up to 200 µm may be selected when the deviations in thickness brought about by the adhesive tape in the carton blanks or cartons for stacking one on top another are of minor importance. Preferred thicknesses are not more than 140 µm.

The olefinic polymer is a homopolymer or copolymer of olefins such as ethylene, propylene, or butylene. The term copolymer is to be understood here to include terpolymers.

The olefinic polymer comprises preferably at least 50 wt % of propylene.

Particularly suitable film raw materials are commercially available polypropylene homopolymers or polypropylene copolymers, including the block polymers (impact polymers) and random polymers.

The melt indices of the stated polymers must be situated within the range that is suitable for flat film extrusion. This range ought to be between 0.3 and 15 g/10 min, preferably in the range of 0.8 to 5 g/10 min (measured at 230° C./2.16 kg).

The polypropylene is preferably predominantly isotatic in structure. The flexural modulus ought to be at least 1000 MPa, preferably at least 1500 MPa, very preferably at least 2000 MPa.

A polar nonolefinic polymer comprehends all polymers which
a) contain no olefin monomer such as ethylene, propylene, or butylene, for example, and
b) include as a polar component heteroatoms such as sulfur, nitrogen, phosphorus, and—preferably—oxygen.

The polar nonolefinic polymer is selected preferably from the group consisting of polyesters, polyamides, polyurethanes, polyoxymethylene, polyarylene sulfides, and polyarylene oxides. Semicrystalline polymers are particularly preferred. In accordance with one particularly advantageous embodiment of the invention, polybutylene terephthalate and/or polyoxymethylene are selected as polar nonolefinic polymer.

The polyolefin with polar modification is selected preferably from the group of the copolymers of olefins with vinyl esters, methacrylic acid, and acrylic acid, more preferably ethylene-vinyl acetate copolymers and ethylene-(meth)acrylate copolymers and their esters, or from the group of the graft polymers with an unsaturated organic acid, more preferably a maleic anhydride-, methacrylic acid-, or acrylic acid-grafted polyolefin, the fraction of polar-modified polyolefin in the mixture being preferably in the range from 0.2 to 10 wt %.

The polymers of the film can be used in pure form or as a blend with additives such as antioxidants, light stabilizers, antiblocking agents, lubricants, and processing assistants, fillers, dyes, pigments, blowing agents, or nucleating agents.

The preferred operation for producing the film, or the adhesive tape A produced using the film, includes the following steps:
- polymers and optionally additives are mixed and supplied in an extruder to a flat film die.
- The melt film is then subjected to controlled cooling on a roll known as a chillroll.
- Before the film web is supplied to the drawing unit, it is heated to a suitable drawing temperature via heated rolls.
- The film is then subjected to short-gap orientation in the machine direction.
- The carrier film is provided with an adhesive by coating or even beforehand by coextrusion.

The film may be a single-ply or multi-ply film, being preferably multi-ply, more preferably of the type ABC, where B comprises the mixture of the invention and A and C consist wholly or predominantly of polyolefinic polymer. Through coextrusion it is possible to prevent deposition during orientation of the film, and problems in the course of coating with release, primer, or adhesive.

The film may have been modified by laminating, embossing, or radiation treatment.

The film may have been given surface treatments. These are, for example, to promote adhesion, corona treatment, flame treatment, fluorine treatment, or plasma treatment, or coatings of solutions or dispersions, or liquid, radiation-curable materials. Further possible coatings are printed coatings and nonstick coatings, as for example those of crosslinked silicones, acrylates (for example, Primal® P 376 LO), polymers with vinylidene chloride or vinyl chloride as monomer, or stearyl compounds such as polyvinyl stearyl-carbamate or the chromium stearate complexes (for example, Quilon® C), or reaction products of maleic anhydride copolymers and stearylamine.

As already mentioned, the film carriers of the adhesive tapes A and B may be identical, or at least both may comprise the described mixture of an olefinic polymer and a polar nonolefinic polymer.

The film carrier of the adhesive tape B preferably is composed of polyethylene, polypropylene, monoaxially or biaxially oriented polypropylene, polyester, PA, PVC, or other films; particular preference is given to MOPP.

The thickness of the carrier film of the adhesive tape B is preferably between 15 and 200 µm, more preferably between 30 and 140 µm, very preferably between 50 and 90 µm.

A thickness of up to 200 µm may be selected when the deviations in thickness brought about by the adhesive tape in the carton blanks or cartons to be stacked one on top another is of minor importance. Thicknesses of not more than 140 μm are preferred.

With further preference, the film carrier has a tensile strength of 200 N/mm² to 300 N/mm², more preferably 220 N/mm² to 260 N/mm², very preferably 240 N/mm², and/or a stretchability of less than 35%.

The adhesive tapes A and B can be produced using all known adhesive systems. Besides adhesives based on natural or synthetic rubber, use may be made in particular of polyacrylate adhesives, preferably a pressure-sensitive acrylate hotmelt adhesive. Silicone adhesives are also possible.

The adhesives in the adhesive tapes A and B may be different. It is preferred for the same adhesive to be used in each case.

The coating thickness with adhesive lies preferably in the range from 18 to 50 g/m², more preferably 22 to 29 g/m² (corresponding approximately to a thickness of 18 to 50 μm, more preferably 22 to 29 μm).

The adhesive is preferably a pressure-sensitive adhesive, in other words an adhesive which even under relatively weak applied pressure allows a durable bond to virtually all substrates and which after use can be detached from the substrate again substantially without residue. At room temperature, a pressure-sensitive adhesive is permanently tacky, thus having a sufficiently low viscosity and a high touch-tack, so that it wets the surface of the respective adhesive base even under slight applied pressure. The bondability of the adhesive derives from its adhesive properties, and the redetachability from its cohesive properties.

The film carriers are coated with pressure-sensitive adhesive on one or both sides, preferably one side, from solution or dispersion or in 100% form (for example, from the melt), or by coextrusion.

For optimization of the properties, the self-adhesive composition employed may have been blended with one or more additives such as tackifiers (resins), plasticizers, fillers, pigments, UV absorbers, light stabilizers, aging inhibitors, crosslinking agents, crosslinking promoters, or elastomers.

Suitable elastomers for blending are, for example, EPDM rubber or EPM rubber, polyisobutylene, butyl rubber, ethylene-vinyl acetate, hydrogenated block copolymers of dienes (for example, by hydrogenation of SBR, cSBR, BAN, NBR, SBS, SIS, or IR; such polymers are known, for example, as SEPS and SEBS), or acrylate copolymers such as ACM.

Tackifiers are, for example, hydrocarbon resins (for example, from unsaturated $C_5$ or $C_7$ monomers), terpene-phenolic resins, terpene resins from raw materials such as α- or β-pinene, aromatic resins such as indene-coumarone resins, or resins of styrene or α-methylstyrene such as rosin and its derivatives, such as disproportionated, dimerized, or esterified resins, in which case glycols, glycerols or pentaerythritol may be used. Particular suitability is possessed by resins stable toward aging, with no olefinic double bond, such as hydrogenated resins, for example.

Suitable fillers and pigments are, for example, carbon black, titanium dioxide, calcium carbonate, zinc carbonate, zinc oxide, silicates, or silica.

Suitable UV absorbers, light stabilizers, and aging inhibitors for the adhesives are those as listed in this specification for the stabilizing of the film.

Suitable plasticizers are, for example, aliphatic, cycloaliphatic, and aromatic mineral oils, diesters or polyesters of phthalic acid, trimellitic acid, or adipic acid, liquid rubbers (for example nitrile rubbers or polyisoprene rubbers), liquid polymers of butene and/or isobutene, acrylic esters, polyvinyl ethers, liquid resins and plasticizer resins based on the raw materials for tackifying resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acid.

One preferred embodiment comprises a pressure-sensitive adhesive composed of synthetic rubber, hydrocarbon resin, and antioxidant.

The adhesive may have been applied in longitudinal direction in the form of a strip with a width lower than the carrier film of the adhesive tape. Depending on the particular utility, it is also possible for two or more parallel strips of the adhesive to have been coated on the carrier film.

The free top face of the adhesive tapes A and B, furnished on one side with adhesive, may have been provided with a release agent, also called parting agent.

Suitable release agents encompass release systems of surfactant kind, based on long-chain alkyl groups such as styrene sulfosuccinates or stearyl sulfosuccinamates, but also polymers, which may be selected from the group consisting of polyvinyl stearylcarbamates, polyethyleneiminestearylcarbamides, chromium complexes of $C_{14}$ to $C_{28}$ fatty acids, and stearyl copolymers, as are described, for example, in DE 28 45 541 A. Likewise suitable are release agents based on acrylic polymers with perfluorinated alkyl groups, silicones, or fluorosilicone compounds, based for example on poly(dimethylsiloxanes). With particular preference the release layer comprises a silicone-based polymer. Particularly preferred examples of such release-active polymers based on silicone include polyurethane- and/or polyurea-modified silicones, preferably organopolysiloxane/polyurea/polyurethane block copolymers, more preferably those as described in example 19 of EP 1 336 683 B1, very preferably anionically stabilized, polyurethane- and urea-modified silicones having a silicone weight fraction of 70% and an acid number of 30 mg KOH/g. The use of polyurethane-modified and/or urea-modified silicones has the effect that the products of the invention combine optimized aging resistance and universal writability with an optimized release behavior. In one preferred embodiment of the invention the release layer comprises 10 to 20 wt %, more preferably 13 to 18 wt %, of the release-active constituent.

The general expression "adhesive tape" for the purposes of this invention encompasses all sheetlike structures such as two-dimensionally extended films or film sections, tapes with extended length and limited width, tape sections and the like, and also, lastly, diecuts or labels.

In the simplest embodiment of the invention, the adhesive tapes A and B are laminated to one another and so form a tear system which may be used on film packaging, paper packaging, card packaging, or carton packs.

The invention is elucidated in more detail below with a number of figures, without thereby wishing to subject the invention to unnecessary restriction.

Figure 3A:
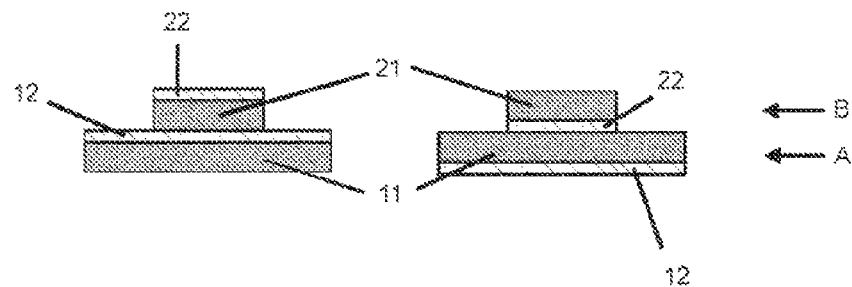

FIG. 3a shows how the disposition of the adhesive tapes to one another can be selected in any desired way. Each of the adhesive tape 1, 2 consists of a film carrier 11, 21, on each of which an adhesive 12, 22 is applied.

The adhesive tape B may be laminated by the adhesive-free side of the film carrier 21 onto the adhesive 12 of the adhesive tape A (left-hand diagram). In this case, the uncovered regions of the adhesive 12 and also the adhesive 22 of the adhesive tape B ensure the hold of the tear-open system on the selected substrate.

It would, however, also be possible for the adhesive tape B to be laminated onto the adhesive tape A in such a way that the adhesive 22 lies directly on the adhesive 11 of the adhesive tape A.

In the right-hand picture in FIG. 3a, the adhesive 22 of the adhesive tape B is shown disposed on the adhesive-free side of the carrier film 11. In this case the adhesive 12 ensures the hold of the tear-open system on the selected substrate.

Figure 3B:
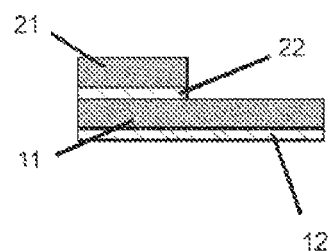

FIG. 3b shows that the inventive concept also encompasses the embodiment wherein the adhesive tape B is disposed on the adhesive tape A such that the carrier films 11, 21 finish flush at the edges.

The tear-open system of the invention also functions in this case.

Figure 3C:
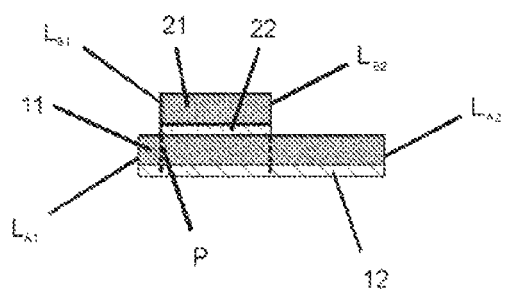

A preferred embodiment is that in which the adhesive tape B is applied on the adhesive tape A with an offset, in other words offset inwardly in relation to the machine direction of the two adhesive tapes A and B. For a perpendicular projection into the plane of the adhesive tape A, therefore, the two long edges $L_{B1}$, $L_{B2}$ of the adhesive tape B (i.e., the edges which extend in the machine direction) always lie between the two long edges $L_{A1}$, $L_{A2}$ of the adhesive tape A. In FIG. 3c, this embodiment of the adhesive tape is shown, and the aforementioned projection P is indicated.

In the case of the embodiment according to FIG. 3b, one long edge $L_{B1}$ would be projected directly onto the long edge $L_{A1}$ of the adhesive tape A. This too is within the inventive concept.

According to a preferred embodiment of the invention, therefore, the adhesive tapes A and B are disposed one above another in such a way that the two long edges $L_{B1}$, $L_{B2}$ of the adhesive tape B (i.e., the edges which extend in the machine direction), on vertical projection into the plane of the adhesive tape A, lie on or between the two long edges $L_{A1}$, $L_{A2}$ of the adhesive tape A, or at least on one of the two long edges $L_{A1}$, $L_{A2}$ of the adhesive tape A.

Particularly preferred are the embodiments shown in FIG. 3a, wherein the adhesive tape B is centrally on the adhesive tape A, producing a symmetrical construction of the tear-open system.

Figure 4:
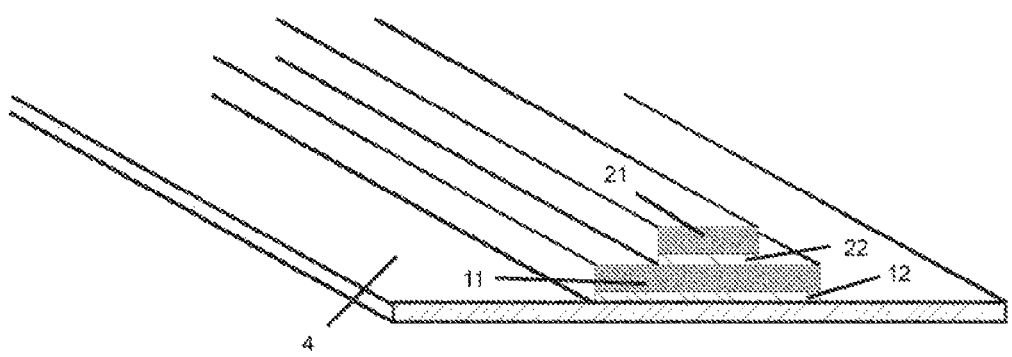
Figure 5:
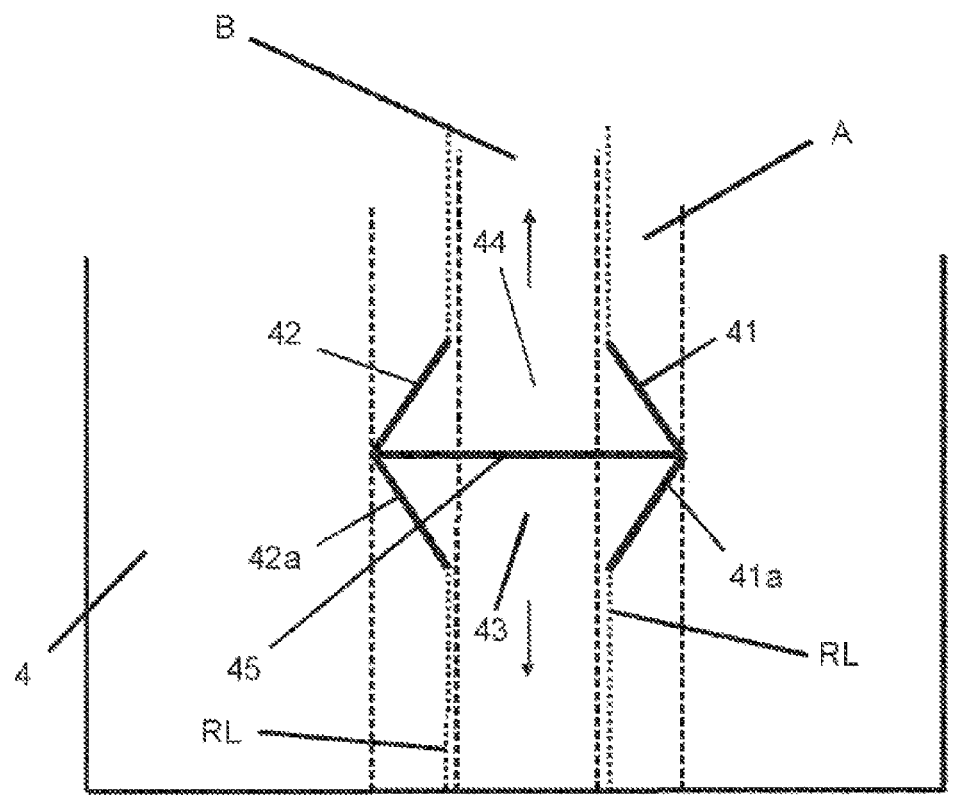

FIG. 4 shows how the tear-open system is applied on the underside of a carton 4, and FIG. 5 shows how the top side of the carton 4 appears. In FIG. 5, the adhesive tapes A and B applied on the underside of the carton 4 are indicated with dashed lines.

In FIG. 5, furthermore, a preferred opening possibility for the carton 4, using the tear strip, is shown.

In the carton 4 there is a kisscut score that produces two grip tabs 43 and 44. The kisscut score consists of two pairs of two limbs in V-shape disposition, 41, 42, 41a, and 42a, with the two limbs 41, 42, 41a, 42a of each pair not intersecting at the potential intersection point. The limbs 41, 42, 41a, 42a are punched right through the carton 4 and the adhesive tape A. Moreover, the connecting line 45 which connects the end points of the limbs 41, 42, 41a, 42a to one another is punched right through the carton 4, the adhesive tape A, and the adhesive tape B.

To open the carton 4, one of the two grip tabs 43, 44, the grip tab 43 for example, is gripped and folded upward. The fully punched-through limbs 41a, 42a produce a tear strip, whose width corresponds to the distance between the ends of limbs 41a, 42a that run toward one another. The width of the tear strip is indicated by the parallel tear lines $R_L$. When the grip tab 43 is pulled in the direction of the arrow shown, the tear-open system parts along the lines $R_L$. This resultant tear strip consists of the severed carton 4, the adhesive tape B, and the parted adhesive tape A.

Owing to the outstanding properties of the film described, the tear strip does not taper either during opening, and so the tear strip severs the entire carton.

By pulling on the other grip tab 44, likewise in the direction indicated by the arrow, a second tear strip is produced.

Figure 6:
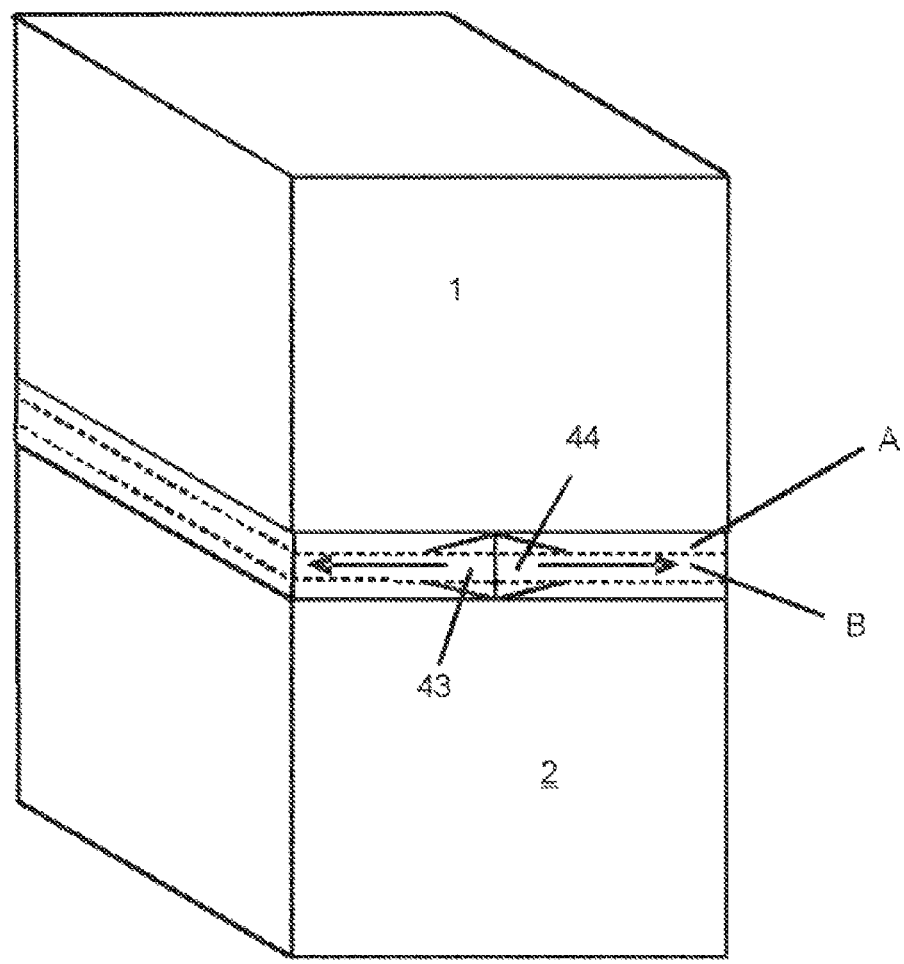

The tear-open system is used with further preference to join two packs (or other structures), two cartons for example, to one another temporarily. This is shown in FIG. 6. The adhesive tape A serves to link two cartons 1, 2 to one another, by means of the adhesive tape A being applied once completely over all four sides of the cartons 1 and 2, in each case running round in the edge region. The adhesive tape B, which is disposed centrally on the adhesive tape A, is located beneath the adhesive tape A, and so the adhesive tape B is shown with dashed lines.

The tear-open possibility described comprehensively in FIG. 5 is provided in the tear strip. To part the two cartons, one or both grip tabs 43, 44 is pulled, and the tear-open system parts, allowing the two cartons 1 and 2 to be separated when the tear-open system is fully severed.

In one variant only the adhesive tape A is utilized to join two packs or other bodies to one another.

Figure 7:
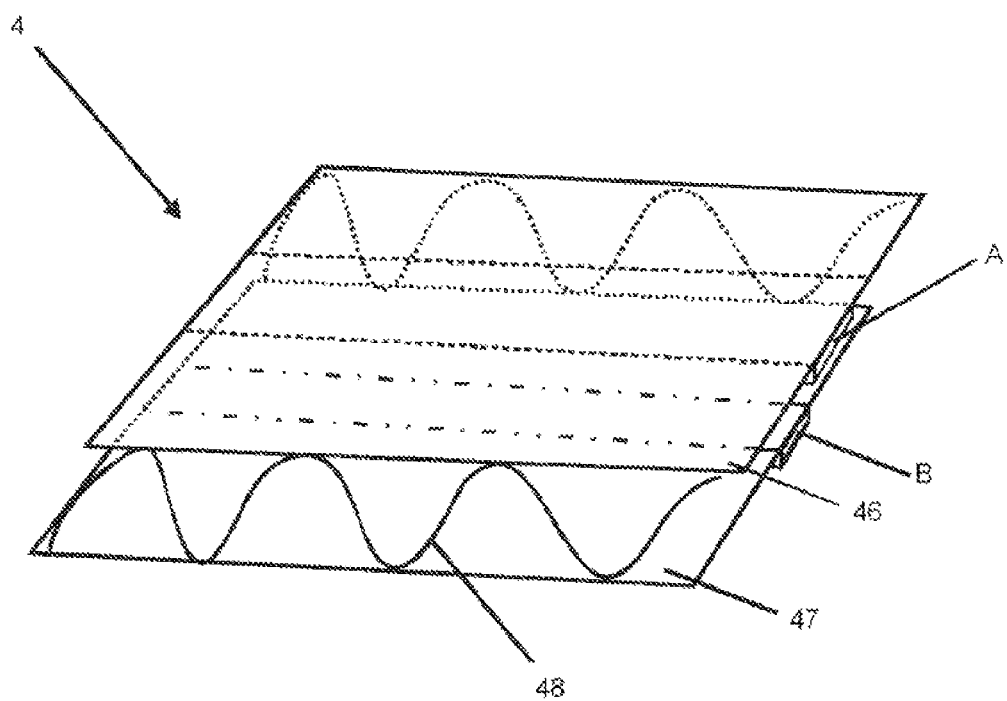

The adhesive tape system is preferably used as a tear strip on a carton 4 which consists of an outer liner 46 and an inner liner 47, there being at least one corrugation 48 made of card disposed between the liners 46 and 47, with the adhesive tape A being mounted on the inside of the outer liner 46, and the adhesive tape B on the outside of the inner liner 47, so that the adhesive tape B is disposed beneath the adhesive tape A. An exemplary embodiment of this use is shown in FIG. 7.

Between the two liners 46 and 47 there is a corrugation 48, with the regions of the carton 4 that are not visible being indicated by dots.

The adhesive tape B is bonded on the outside of the inner liner 47, with the further course of the adhesive tape B being indicated with dots and dashes.

The adhesive tape A is bonded on the inside of the outer liner 46, with the further course of the adhesive tape A being indicated with dashes.

Figure 8:
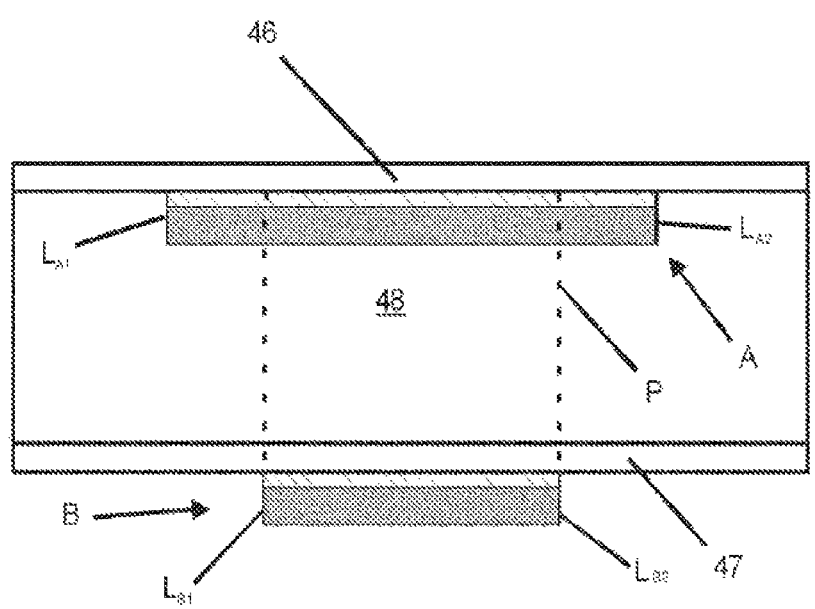

FIG. 8 shows the tear-open system of the invention again in the use shown in FIG. 7, in a corrugated card 4. The corrugation 48 in this case runs perpendicularly out of the plane of the drawing. The adhesive tape B is bonded on the outside of the inner liner 47, and the adhesive tape A on the inside of the outer liner 46.

As already indicated in FIG. 3c, the embodiment that is preferred is that in which the adhesive tape B is applied with an offset relative to the adhesive tape A, in other words offset inwardly in relation to the machine direction of the two adhesive tapes A and B. Therefore the two long edges $L_{B1}$ and $L_{B2}$ of the adhesive tape B (i.e. the edges which extend in the machine direction), with vertical projection into the plane of the adhesive tape A, always lie between the two long edges $L_{A1}$ and $L_{A2}$ of the adhesive tape A, or one long edge $L_{B1}$ or $L_{B2}$ of the adhesive tape B lies on one of the long edges $L_{A1}$ and $L_{A2}$ of the adhesive tape A.

The other variants of the tear-open system that are shown in FIGS. 3a and 3b can also be transposed, correspondingly, to these embodiments of the tear-open system.

With further preference, the adhesive tape A and the adhesive tape B are applied in the form of a self-contained line on the body of the carton, or in the form of two or more self-contained lines at different heights on the body.

The line formed by the adhesive tapes preferably lies in a plane which is oriented parallel to the base of the upright body.

The line may also surround a corner of the body in such a way that after the tear-open procedure, a tetrahedral part is removed from the rest of the body.

In one variant of the invention, the adhesive tapes do not form a self-contained line but instead take out a side wall of the carton. If the tear-open system is then removed, the last wall remains intact and is able thus to take on a hinge function, especially if the wall has a fold in the continuation of the line. In this way a lid is formed, which can be folded open and closed via the hinge.

The adhesive tape A and the adhesive tape B are preferably applied at right angles to the corrugation of the carton.

In accordance with a further preferred embodiment, there is a kisscut score on the carton that completely severs the adhesive tape A, and preferably the carton lying beneath it, and which serves as a grip tab for the tear strip when the carton is torn open.

The adhesive tape B lies beneath the grip tab and is preferably likewise severed by the kisscut score. When the grip tab is gripped, the adhesive tape B of the resulting tear strip is located on the underside of the grip tab.

The kisscut score also defines the later width of the tear strip.

To tear a pack equipped with the adhesive tape adhesive of the invention, preferably the entire width of the adhesive tape B is used, whereas only a partial region of the adhesive tape A is used for the tear strip.

The width of the adhesive tape A is preferably between 10 and 50 mm, more preferably between 12 and 25 mm.

The width of the adhesive tape B is preferably between 2 and 10 mm, more preferably between 3 and 6 mm.

The width selected for the adhesive tape is preferably lower than the width of the adhesive tape A, and more particularly is in a ratio between 1:2 and 1:4. Also possible, however, is the embodiment in which the widths of the adhesive tapes A and B are identical.

In accordance with one preferred embodiment of the invention, the tear strip formed from the adhesive tape system has a width of 2 to 10 mm, more preferably between 3 and 6 mm.

The kisscut score may be executed in the form of two limbs in V-shape disposition which do not make contact at the potential intersection point.

With further preference, a diecut line joins the two other ends of the limbs, producing the form of a triangle with its apex missing. This triangle forms the grip tab on the tear strip.

In order to produce a suitable grip tab, the adhesive tape A must in some form or another be severed in the cross-direction, in other words against the orientation. To define the width of the tear strip—if the tear strip is to be disposed centrally in the adhesive tape A—it is necessary for two incisions in longitudinal direction to sever the adhesive tape A. For example, the adhesive tape A could be punctured at two points whose connecting line is incised into the adhesive tape A (preferably this connecting line is aligned at right angles to the long edge). If the tear strip is to be formed in the marginal region of the adhesive tape A, a single incision is sufficient.

In this way, the preferred embodiment of the invention is produced, namely that in which the tear strip resulting from the adhesive tape A, among other components, has a lower width than the adhesive tape A.

The grip tab need not necessarily be diecut. It is also possible for the grip tab to be produced using a blade, by at least partly severing the adhesive tape A in the cross direction, and introducing, at the parting line, two notches, pointing substantially in machine direction, into the adhesive tape A, with the distance between the notches defining the width of the tear strip. The notches and the incision define a grip tab region that forms the beginning of the tear strip. In this case it should be ensured that the adhesive tape B as well is severed at the same time.

For example, the adhesive tape system described is bonded during corrugated card production on the corrugated card line. In further steps, the sheet formed after the corrugated card line is made up further into a box. On the box at least one kisscut score is made, allowing a grip tab to be extracted from the adhesive tape system for the purpose of subsequent opening of the pack. This grip tab is pulled, and the grip tab strip that forms separates the card ply located directly above it from the box during the opening process.

Further encompassed by the concept of the invention is a carton which consists of an outer liner and an inner liner, at least one card corrugation equipped with an adhesive tape system of the invention being disposed between the liners, with the adhesive tape A being applied on the inside of the outer liner and the adhesive tape B being applied on the outside of the inner liner, so that the adhesive tape B is disposed beneath the adhesive tape A.

Especially with a synthetic rubber-based adhesive that exhibits sufficient bond strength and high tack, the adhesive tape A displays effective bonding on a variety of paper substrates.

Owing to the specific film carrier, tears therein that start from the kisscut score are propagated, surprisingly, in straight lines parallel to the machine direction (x-direction).

A further surprise is that the film does not only not tear further transverse to the direction of orientation, but instead reliably supports the continued tearing of the film in machine direction. This means that there is no tapering in the y-direction (in transverse direction of the strip) or else in z-direction (the direction that defines the direction of the carrier). As a result, tear continuation is possible only in the x-direction (longitudinal or machine direction). Furthermore, continuous tear propagation in the x-direction is easy to accomplish manually, in addition to the severing of the corrugated card.

Possibly there is a slight tapering or broadening in the cross-direction, but preferably not more than 5 parts per million, based on the length.

The necessary strengths can be achieved with significantly reduced thicknesses of material, meaning that the overall thickness of adhesive tape can be reduced by up to 50% as compared with the Adalis system described earlier. This leads to less wear on the printing, improved stability in carton stacking, and enables greater running lengths of the adhesive tape rolls—that is, larger manufacturing campaigns can be run readily without interruption to the operation.

Likewise in particular with a synthetic rubber-based adhesive which exhibits sufficient bond strength and a high tack, adhesive tape B displays effective bonding to a variety of paper substrates.

Furthermore, the film carrier has a high tensile strength, since the adhesive tape is required to accommodate the primary load during opening of the carton, and must not tear. Furthermore, the carrier exhibits a low stretch, more particularly a stretchability of less than 35%, since otherwise it stretches too greatly under the prevailing loads.

The invention is elucidated in more detail with a number of examples, without any intention that the invention should be restricted thereby in any way whatsoever.

EXAMPLES

Test Methods

The measurements are conducted under test conditions of 23±1° C. and 50±5% relative humidity.

Tensile Elongation Behavior

The tensile elongation behavior of the adhesive tape is determined on test specimens (rectangular test strips 100 mm long and 15 mm wide) in accordance with DIN EN 14410:2003 527-3/2/300, with a test velocity of 300 mm/min, a clamped-in length of 100 mm, and a pre-tensioning force of 0.3 N/cm, with specimens being cut to shape with sharp blades for the determination of the data.

Unless indicated otherwise, the tensile elongation behavior is tested in machine direction (MD). The force (tensile strength) is expressed in N/strip width, and the elongation at break in %. The test results, especially the elongation at break (breaking stretch), must be statistically ensured by means of five measurements.

Peel Strength (Bond Strength BS)

For the measurement of the bond strengths, test strips 19 mm wide were adhered without bubbles to a finely abraded (emery paper with FEPA 240 grade abrasive) plate made of stainless steel, and were pressed on using a rubber-clad 2 kg roller, with a speed of 10 m/min. The steel plate and the protruding end of the adhesive tape were then clamped into the ends of a tensile testing machine in such a way as to produce a peel angle of 180°. The adhesive tape was peeled from the steel plate at a speed of 300 mm/min. The bond strength is stated in N/cm.

Holding Power (HP; Shear Resistance Time)

The holding power indicates the bonding strength for a loading force acting parallel to the bonded tape. It is the time measured until a loaded adhesive tape shears off completely from a steel plate.

To determine the HP values, a test strip 19 mm wide is adhered to a pretreated steel plaque in such a way as to give a bond area of 19×20 mm². By means of a clip, a 1 kg weight is suspended from the protruding end of the adhesive tape, thus transmitting a vertical tension force of 5.15 N per 1 cm tape width.

The unit of the holding power is minutes. Where there is a ">" sign before the values, this means that the measurements were discontinued after this time, since no shearing at all was apparent at that point.

Thickness

This is determined in accordance with DIN 53370.

Raw Materials

Dow 7C06:
PP block copolymer, MFI 1.5 g/10 min, not nucleated, flexural modulus 1280 MPa (Dow Chemical)

Bormod HD 905 CF:
PP homopolymer, MFI 6 g/10 min, flexural modulus 2150 MPa, contains an α-nucleating agent (Borealis)

Dowlex 2032:
PE-LLD, MFI 2 g/10 min (Dow Chemical)

Stryon 457:
PS-HI, MFI 3 g/10 min, flexural modulus 2200 MPa (Dow Chemical)

EVAL G156B:
EVAL ethylene content 48 mol %, MFI 6.4 g/10 min, flexural modulus 2800 MPa (EVAL Europe)

Licocene PP MA 7452 GR TP:
PP-g-MA, metallocene polypropylene wax grafted with maleic anhydride (Clariant)

Hostaform C9021 natural:
POM, MFI 8 g/10 min, flexural modulus 2800 MPa (Ticona)

Celanex 2002-2 natural:
PBT, MFI 20, flexural modulus 2500 MPa (Ticona)

Advantageous embodiments of the adhesive tape of the invention are described below by means of examples, without wishing to restrict the invention unnecessarily thereby.

Example 1

The raw materials are compounded and pelletized. The pellets are supplied to a single-screw extrusion system. The film carrier for the adhesive tape A is produced on this single-screw extrusion system, with a flat die having a flexible die lip, in a layer, followed by a chillroll station and a single-stage short-gap drawing system.

Dow 7C06, Celanex 2002-2 natural, and Licocene PP MA 7452 GR TP are mixed in a ratio of 15:4:1 and the mixture is extruded. The die temperature is 230° C. Chillroll temperatures and drawing roll temperatures are set so as to maximize the crystallinity of the film before and after drawing. The draw ratio is 1:5.

Film Properties:

| | |
|---|---|
| Tensile strength/N/mm² | 240 |
| Width/mm | 25 |
| Elongation at break/% | 30 |
| Thickness/μm | 60 |

The film is coated on the top face with 0.07 g/m² carbamate release, and dried.

The adhesive is mixed in the melt from 42 wt % SIS elastomer, 20 wt % pentaerythritol ester of hydrogenated rosin, 37 wt % a $C_5$ hydrocarbon resin having an R&B value of 85° C., and 1 wt % Irganox® 1010 antioxidant, and the mixture is applied to the underside of the film, at 28 g/m² at 150° C. using a nozzle.

A BS to steel of 5 N/cm and a shear strength of greater than 3000 minutes are obtained.

The film carrier of the adhesive tape B is a MOPP film.
Film Properties:

| | |
|---|---|
| Tensile strength/N/mm² | 240 |
| Width/mm | 4 |
| Elongation at break/% | 27 |
| Thickness/μm | 60 |

The film is coated on the top face with 0.05 g/m² silicone release, and dried.

The adhesive is mixed in the melt from 42 wt % SIS elastomer, 20 wt % pentaerythritol ester of hydrogenated rosin, 37 wt % a $C_5$ hydrocarbon resin having an R&B value of 85° C., and 1 wt % Irganox® 1010 antioxidant, and the mixture is applied to the underside of the film, at 25 g/m² at 150° C. using a nozzle.

A BS to steel of 5 N/cm and a shear strength of greater than 3000 minutes are obtained.

The adhesive tapes A and B are applied, as described in accordance with the invention, to a carton composed of a 2.30 double corrugation as per RAL-GZ 492 (DUETSCHES INSTITUT FOR GÜTESICHERUNG UND KENNZEICHNUNG E.V.).

Tearing the carton open produces a clean edge and only a slight deterioration to the outer liner.

Example 2

The film carrier for the adhesive tape A from example 1 is used, but with a width of 15 mm.
Film Properties:

| | |
|---|---|
| Tensile strength/N/mm² | 240 |
| Width/mm | 15 |
| Elongation at break/% | 30 |
| Thickness/μm | 60 |

The film carrier of the adhesive tape B is a MOPP film.
Film Properties:

| | |
|---|---|
| Tensile strength/N/mm² | 260 |
| Width/mm | 6 |
| Elongation at break/% | 30 |
| Thickness/μm | 85 |

The film is coated on the top face with 0.05 g/m² silicone release, and dried.

The adhesive is mixed in the melt from 42 wt % SIS elastomer, 20 wt % pentaerythritol ester of hydrogenated rosin, 37 wt % a $C_5$ hydrocarbon resin having an R&B value of 85° C., and 1 wt % Irganox® 1010 antioxidant, and the mixture is applied to the underside of the film, at 26 g/m² at 150° C. using a nozzle.

A BS to steel of 5 N/cm and a shear strength of greater than 3000 minutes are obtained.

The adhesive tapes A and B are applied, as described in accordance with the invention, to a carton composed of a 1.40 single corrugation as per RAL-GZ 492 (DUETSCHES INSTITUT FOR GÜTESICHERUNG UND KENNZEICHNUNG E.V.).

Tearing the carton open produces a clean edge and only a slight deterioration to the outer liner.

The invention claimed is:

1. A carton consisting of an outer liner and an inner liner, there being disposed between the liners at least one corrugation of card, furnished with an adhesive tape system consisting of:
    an adhesive tape A furnished on at least one side with an adhesive coating and having a film carrier, the film carrier being a film oriented monoaxially in the longitudinal direction of the strip, and the film carrier comprises a mixture of an olefinic polymer and a polar nonolefinic polymer; and
    an adhesive tape B furnished on at least one side with an adhesive coating and having a film carrier,
    wherein the adhesive tapes A and B are disposed one above the other,
    wherein the total width of the adhesive tape B is less than the total width of the adhesive A,
    wherein the adhesive tape A of the adhesive tape system is applied on the inside of the outer liner, and the adhesive tape B of the adhesive tape system is applied on the outside of the inner liner, so that the adhesive tape B is disposed beneath the adhesive tape A, and
    further wherein the adhesive tape A is located between the adhesive tape B and the carton.

2. The carton according to claim 1, wherein, in the film carrier of the adhesive tape A, a fraction of polar nonolefinic polymer in the mixture of the film carrier of the adhesive tape A is in the range from 5 to 50 wt %.

3. The carton according to claim 1, wherein the film carrier of the adhesive tape A and the film carrier of the adhesive tape B is a polyolefin film oriented monoaxially in the longitudinal direction of the system, and the film carrier of adhesive tape B comprises a mixture of olefinic polymer and a polar nonolefinic polymer.

4. The carton according to claim 1, wherein the film carrier of the adhesive tape A has a thickness of 15 to 200 μm.

5. The carton according to claim 1, wherein, in the film carrier of the adhesive tape A, the olefinic polymer comprises at least 50 wt % of propylene.

6. The carton according to claim 1, wherein, in the film carrier of the adhesive tape A, the polar nonolefinic polymer is selected from the group consisting of polyesters, polyamides, polyoxymethylene, polyarylene sulfides, polyarylene oxides, and polyurethanes, wherein the nonolefinic polymer is semicrystalline.

7. The carton according to claim 1, wherein the film carrier of the adhesive tape B has a tensile strength of 200 N/mm² to 300 N/mm², and a stretchability of less than 35%.

8. The carton according to claim 1, wherein, in the film carrier of the adhesive tape A, the polar nonolefinic polymer is polybutylene terephthalate.

9. The carton according to claim 3, wherein the film carrier of the adhesive tape A and the film carrier of adhesive tape B are identical.

10. The carton according to claim 4, wherein the film of the adhesive tape A has a thickness of 50 to 100 μm.

11. The carton according to claim 1, wherein the film of the adhesive tape A has:
    a machine-direction draw ratio of at least 1:4.5;
    a machine-direction tensile strength of 200 N/mm² to 300 N/mm²; and
    a machine-direction stress at 10% strain of at least 80 N/mm².

12. The carton according to claim 1, wherein the total width of the adhesive tape B is located centrally with respect to the total width of the adhesive tape A producing a symmetrical construction of the system.

13. The carton according to claim 7, wherein the stretchability of the film carrier of the adhesive tape B is at least 27%.

14. The carton according to claim 13, wherein the stretchability of the film carrier of the adhesive tape B is no more than 30%.

* * * * *